United States Patent [19]
Göken et al.

[11] Patent Number: 5,708,545
[45] Date of Patent: Jan. 13, 1998

[54] RECORDING DEVICE WITH ELECTRICAL CONTACTS

[75] Inventors: Klaus Göken, Ritterhude; Jens Spille, Laatzen; Hans-Joachim Platte, Hemmingen; Ernst F. Schröder, Hanover, all of Germany

[73] Assignee: Deutsche Thomson-Brandt GmbH, Villingen-Schwenningen, Germany

[21] Appl. No.: 367,200

[22] PCT Filed: Jul. 21, 1993

[86] PCT No.: PCT/EP93/01935

§ 371 Date: May 3, 1995

§ 102(e) Date: May 3, 1995

[87] PCT Pub. No.: WO94/02912

PCT Pub. Date: Feb. 3, 1994

[30] Foreign Application Priority Data

| Jul. 23, 1992 | [DE] | Germany | 42 24 371.8 |
| Aug. 11, 1992 | [DE] | Germany | 42 26 408.1 |
| May 5, 1993 | [DE] | Germany | 43 14 901.4 |

[51] Int. Cl.$^6$ .................................... G11B 23/02
[52] U.S. Cl. .................................... 360/132
[58] Field of Search ............... 360/132, 137; 235/492, 441

[56] References Cited

U.S. PATENT DOCUMENTS

| 4,044,229 | 8/1977 | Samreus | 235/61.11 |
| 4,044,231 | 8/1977 | Beck et al. | 235/61.12 |
| 4,338,644 | 7/1982 | Staar | 360/132 |
| 5,038,235 | 8/1991 | Ohzawa et al. | 360/92 |
| 5,055,947 | 10/1991 | Satoh | 360/132 |
| 5,159,182 | 10/1992 | Eisle | 360/132 X |
| 5,321,679 | 6/1994 | Horiguchi | 369/58 X |
| 5,351,159 | 9/1994 | Dodt et al. | 360/132 |
| 5,434,721 | 7/1995 | Sawada et al. | 360/132 X |

FOREIGN PATENT DOCUMENTS

| 0422481 | 5/1980 | European Pat. Off. . |
| 0125848 | 11/1984 | European Pat. Off. . |
| 0323347 | 7/1989 | European Pat. Off. . |
| 0420030 | 4/1991 | European Pat. Off. . |
| 2943409 | 5/1980 | Germany . |

*Primary Examiner*—John H. Wolff
*Attorney, Agent, or Firm*—Joseph S. Tripoli; Frederick A. Wein

[57] ABSTRACT

Electrical contact surfaces, especially when connected to a chip, are designed to be purely functional. However, according to the present disclosure, the contact surfaces are designed so that their external shape is that of a visible letter or symbol with a meaningful content. These contact surfaces may, e.g., be placed on cassette casings for recognition. In a stripe or bar code unit consisting of several code components, i.e., bars, individual bars are electrically conductive to facilitate additional coding. The electrically conductive bars or the contact surfaces are preferably connected to the terminals of an integrated circuit.

11 Claims, 11 Drawing Sheets

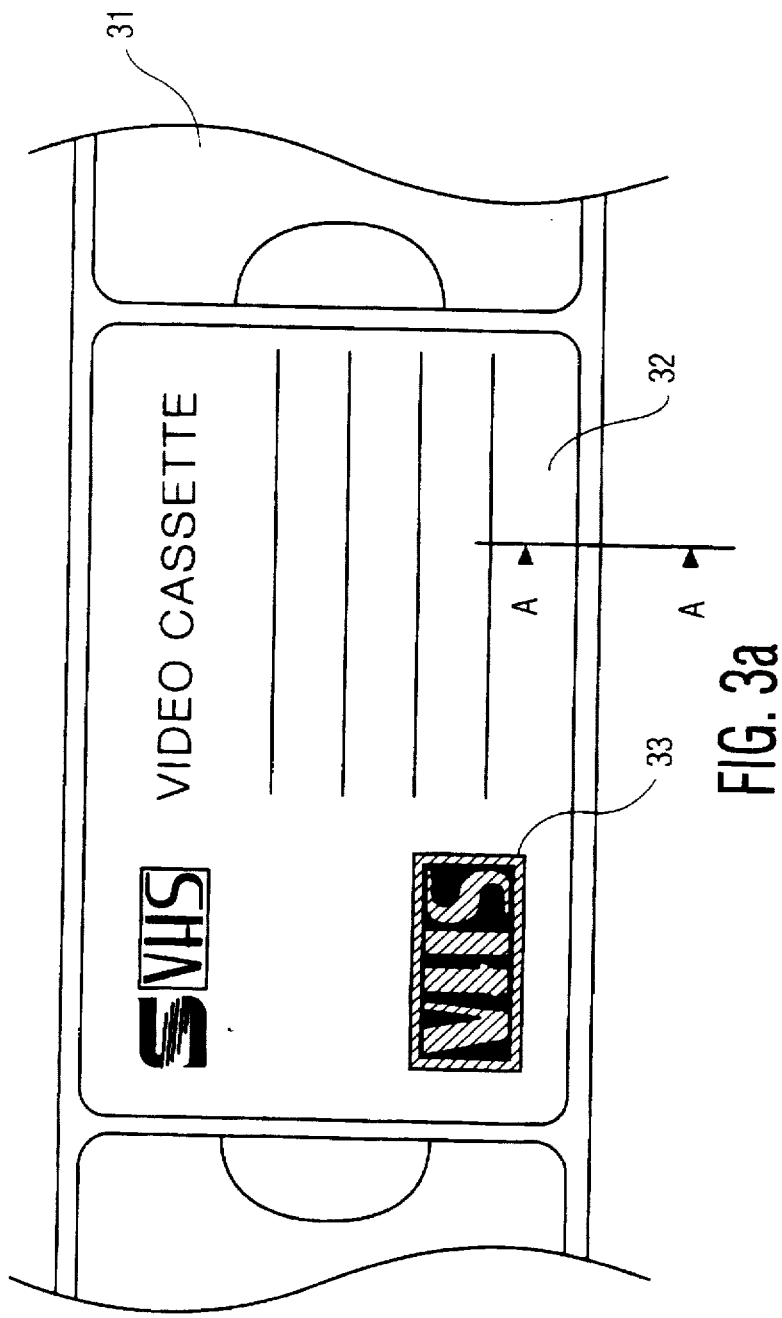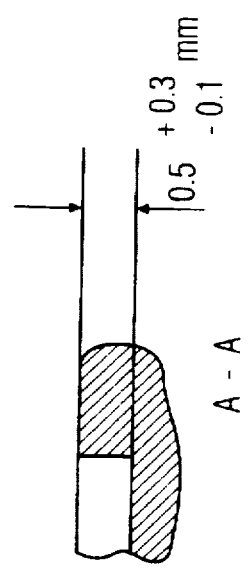
FIG. 3a
FIG. 3b

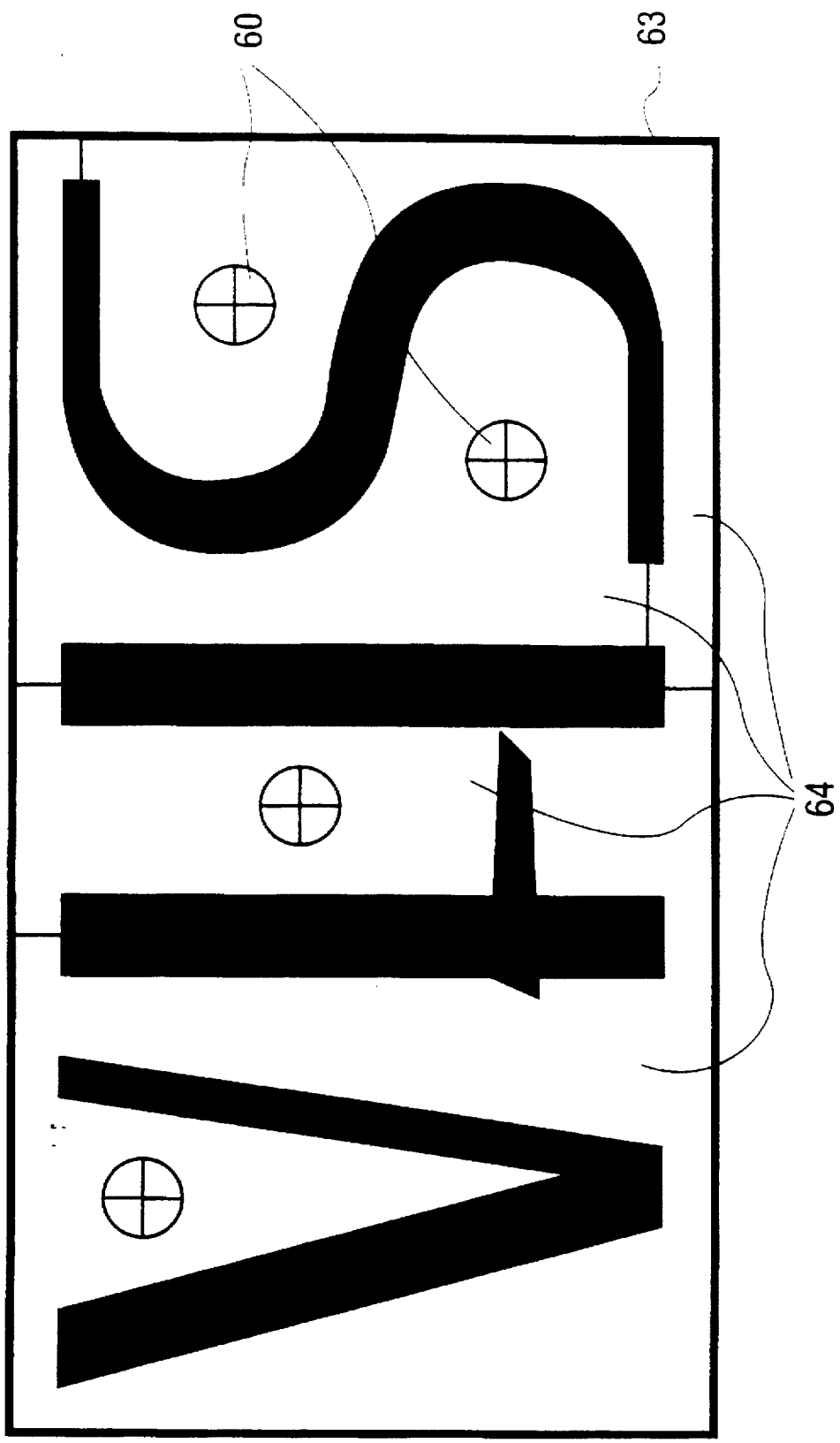

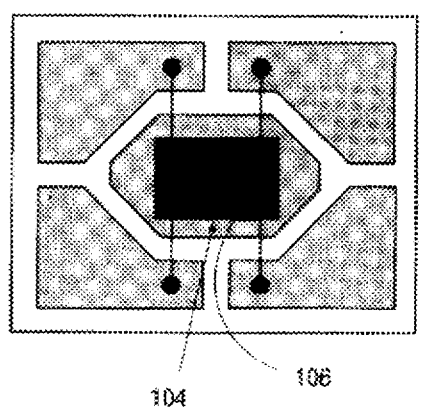
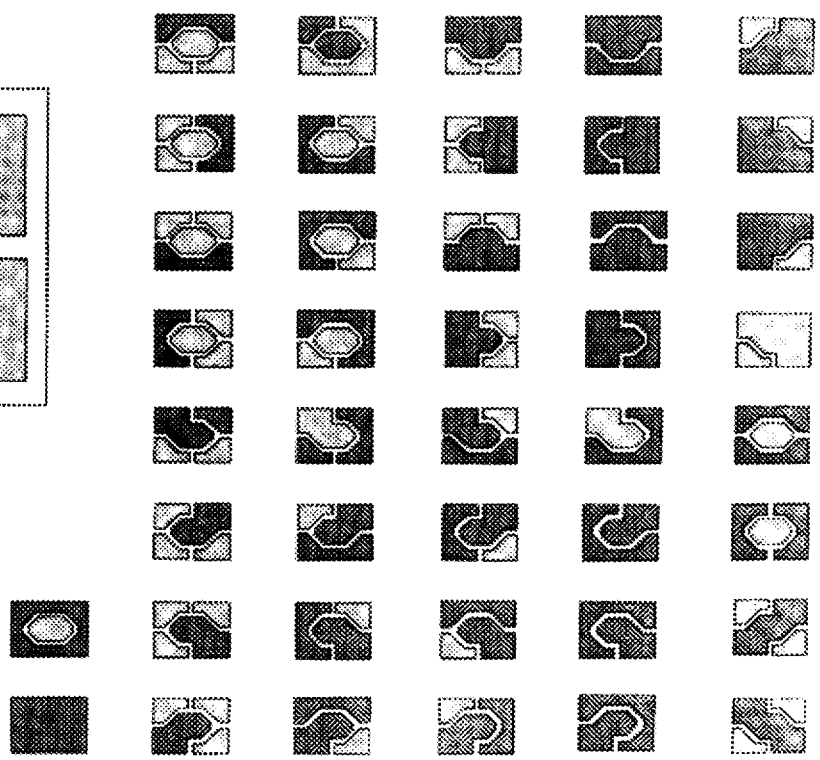
FIG. 10b

RECORDING DEVICE WITH ELECTRICAL CONTACTS

The invention relates to a contact means and a product using this contact means and a device for accepting this product.

PRIOR ART

Barcode units consist of a plurality of code elements—so-called bars—whose information content can be read and evaluated with the aid of optical scanning. It is known to design an electrical or electromagnetic or optical contact, or such a contact section in a purely functional fashion in such a way that a suitable interface for a contacting means having this contact or contact section is formed.

INVENTION

The object of the invention is to design a contact or a contact section in such a way that an additional use is made possible.

The invention has the further object of specifying a product with advantageous use of this contact means.

The invention has the further object of specifying a device for accepting this product.

Barcodes are generally known, and their coding specification is internationally standardized. In this code, information is represented by individual code elements—the so-called bars. Stickers or labels which carry the barcode are known as barcode units, these stickers or labels being attached regularly to different products of all sorts for completely different information and storage purposes. The barcode can be optically scanned by means of a barcode reader and fed for further processing to an evaluation unit.

In accordance with the invention, individual bars or interspaces between the bars are designed to be electrically conductive. In addition to the optical scanning of the barcode, this also permits the barcode to be scanned electrically using contacts.

It is particularly advantageous when electrically conductive bars are connected to contacts or terminals of an integrated circuit, in particular when the circuit is a memory. The information normally contained in a separate barcode unit and/or, in addition, other information can be accommodated in an extremely space-saving fashion in the terminals or in the memory of the integrated circuit. A separate barcode unit can be saved by such an arrangement, or the information stock of the barcode unit can be substantially increased. An EEPROM (Electrical Erasable Programmable Read Only Memory) is particularly suitable as a memory.

Individual adjacent bars can be connected to one another electrically so that they form a group. This can be produced, for example, by an electrically conductive contact layer on the or below the bars. Access to the contacts is thereby facilitated.

The invention can be applied in an outstanding way in recording carriers such as, for example, video cassettes. It is known to apply a barcode unit to a video cassette, the barcode containing information on the recording carrier and on the contents thereof, or containing control information for a video recorder. The coded information of the barcode is scanned by means of a barcode reader in the video cassette recorder and fed to an evaluation unit and evaluated, as well as being represented on the video recorder itself or by means of an on-screen display (OSD) circuit on a television set.

It is now possible by means of the invention to read out not only information on the barcode, but also, or as an alternative to this, the information from the electric circuit or storage circuit connected to the bars, doing so in a simple way without accommodating the memory or the circuit at another point than that of the barcode unit.

Electrical contacts, such as on telephone cards, for example, are normally designed in a purely functional fashion with respect to area or volume, with the result that a contacting means can be satisfactorily connected to the electrical contact. According to the invention, the electrical contact or the electrical contact section has a further function, however, specifically that the external shape of the electrical contacts or contact section itself forms a visible graphic character or representational symbol with a specific information content.

The use of such a contact means may be set forth below on the example of a video cassette with a storage device which is connected to the electrical contact. A storage device for a cassette is disclosed in German Patent DE-C-2943409. Moreover, it is also known to arrange a labelling field on cassettes—on the side of the cassette (side label) and/or on the top of the cassette (top label). If the electrical contacts are connected to contacts of an electric circuit (IC), for example a memory, signals and information can be read into the memory or read out of the memory.

An elegant and space-saving design of the contacts.

In principle, the contact means according to the invention contains a plurality of contact elements, it being the case that the external shape of the contact elements is that the external shape of the contact elements is designed as visible graphic characters or as a representational symbol with a meaningful content or as a part thereof, and the contact elements are of an electrical or electromagnetic or optical type, or that the external shape of the contact elements is designed as an interspace between visible graphic characters or a representational symbol with a meaningful content or as a part thereof, and the contact elements are of an electrical or electromagnetic or optical type, or that the external shape of one or more graphic characters or of a representational symbol with a meaningful content is integrated into the contact means, the graphic characters or the representational symbol or parts thereof being electrically or electromagnetically or optically conductive and/or being designed as a part of the contact means, or that the external shape of the contact elements corresponds to a readable code which is produced by electrical or physical connection or separation of specific contact elements.

Advantageous developments of the contact means according to the invention follow from the associated dependent claims.

In principle, the product according to the invention contains at least one contact means according to the invention.

Advantageous developments of the product according to the invention follow from the associated dependent claim.

In principle, the device according to the invention serves to accept this product according to the invention, and has means for scanning the electrically conductive bars or the contact elements of the product.

Advantageous developments of the device according to the invention follow from the associated dependent claims.

DRAWINGS

Exemplary embodiments of the invention are described with the aid of the drawings, in which:

FIG. 3a shows an electrical contact according to the invention with a memory which is arranged in a labelling field on a video cassette;

FIG. 3b shows a section through FIG. 3a along the line A—A;

FIG. 6 shows a plan view of an electrical contact whose external shape is designed as the interspace between a visible graphic character;

FIG. 10 shows contacting surfaces Containing a code; and

DETAILED DESCRIPTION OF THE PREFERRED EMBODIMENTS

Figure 1:
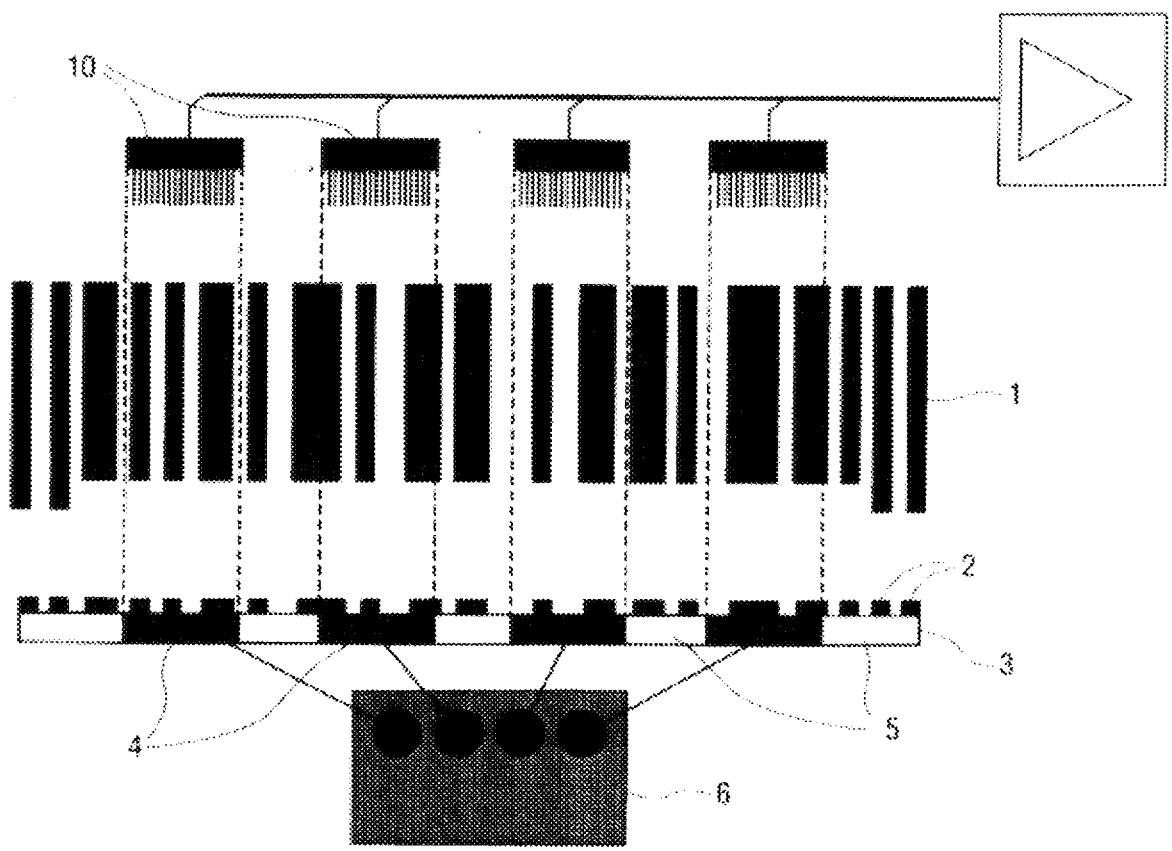
FIG. 1 shows a barcode unit according to the invention.

FIG. 1 shows in the middle a known barcode unit 1, which is composed of a plurality of code elements—the so-called bars 2.

Furthermore, in the lower half FIG. 1 shows a section, extending through the plane of the sheet, through the barcode unit 1, the bars 2 of which are designed in an electrically conductive fashion of graphite or metal and are arranged on a carrier 3. The carrier 3 has electrically conductive contact zones 4 which are separated from one another by insulation zones 5.

The effect of the contact zones 4 is that specific bars 2 situated adjacently are respectively electrically connected to one another and form a group within each contact zone. The bars forming a group are respectively connected to the contact of one (or more) chips 6, which can be an EEPROM memory. The signals can be read out from the chip 6 by means of contact brushes 10. The entire thickness of the barcode unit together with the carrier and the chip can be less than 1 mm, for example 0.5 mm. Consequently, the barcode unit according to the invention can be arranged on products of all types.

Figure 2:
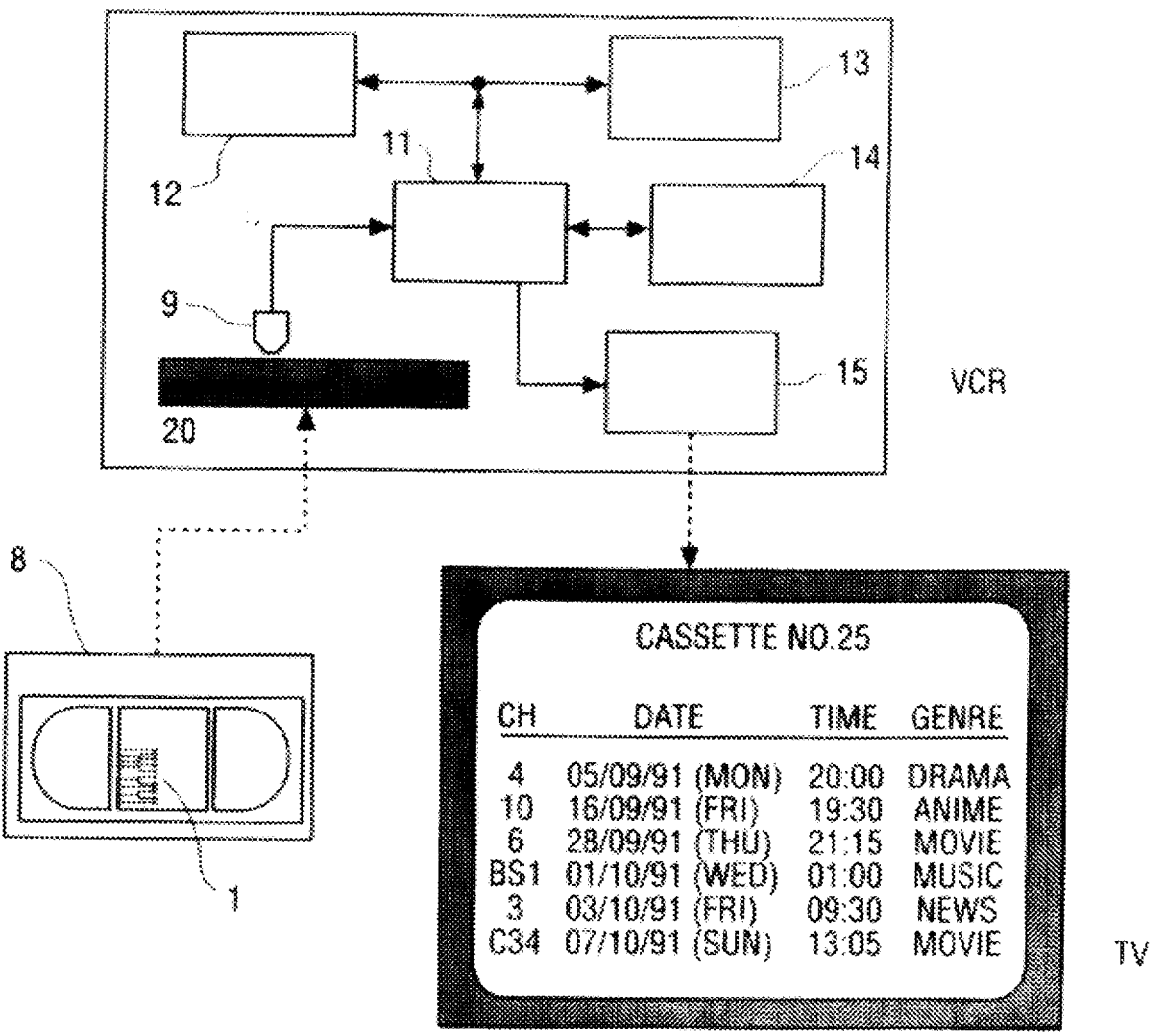
FIG. 2 shows a video recorder according to the invention.

In FIG. 2, the barcode unit 1 according to the invention is arranged on a video cassette 8. The video recorder VCR has a barcode reader 9 and the contact brushes 10 (not represented in FIG. 2). The signals of the barcode which are scanned with the barcode reader 9 are fed, as also is the stored information in the video recorder read out from the chip 6 by the contact brushes 10, from the cassette inserted into a cassette compartment 20 to a microcomputer 11 which is connected to a timer microcomputer 12, a system control microcomputer 13 and a SRAM memory 14 via buslines. One output of the microcomputer 11 is connected to an on-screen display circuit (OSD) 15 which processes the information of the barcode and/or the information stored in the memory chip for the purpose of an on-screen representation in a television set TV.

When the video cassette 8 is drawn into the cassette compartment 20, the barcode unit 1 is guided past the barcode reader 9 in the video recorder VCR and read. After the video cassette is fixed in the video recorder, the contact brushes 10 represented in FIG. 1 can be applied to the bars or contact zones, with the result that a connection to the chip 6 is produced and it is possible to read out the information stored in the memory chip. It is, of course, advantageous when the barcode reader 9 and the contact brushes 10 form a structural unit.

If the video recorder has only the barcode reader 9 or only the contact brushes 10, it is possible in any case to read out the cassette-typical information or the contents list of the cassette via the reader 9 or the brushes 10.

FIG. 3a shows a video cassette 31 with a labelling field 32 as top label. A contact unit 33 with four electrical contacts is designed in the labelling field 32, the electrical contacts forming the letters "VHS". Owing to a skilful shaping of the letter "H", the latter has two separate contact surfaces. The electrical contact is thus designed as a graphic character or representational symbol with a meaningful content.

Figure 4A:
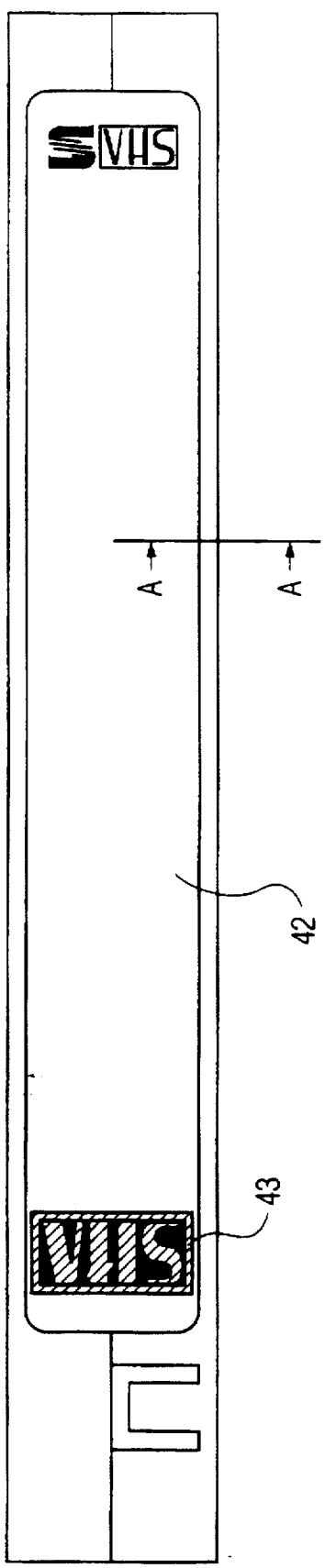
FIG. 4 shows a labelling field according to the invention for a side label of a video cassette.
Figure 4B:
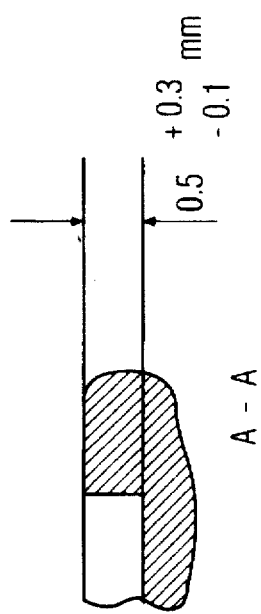

FIG. 4a shows a labelling field 42 with the electrical contact unit 43 as a side label of a video cassette. FIG. 4b shows a section along the line A—A.

Figures 5A, 5B:
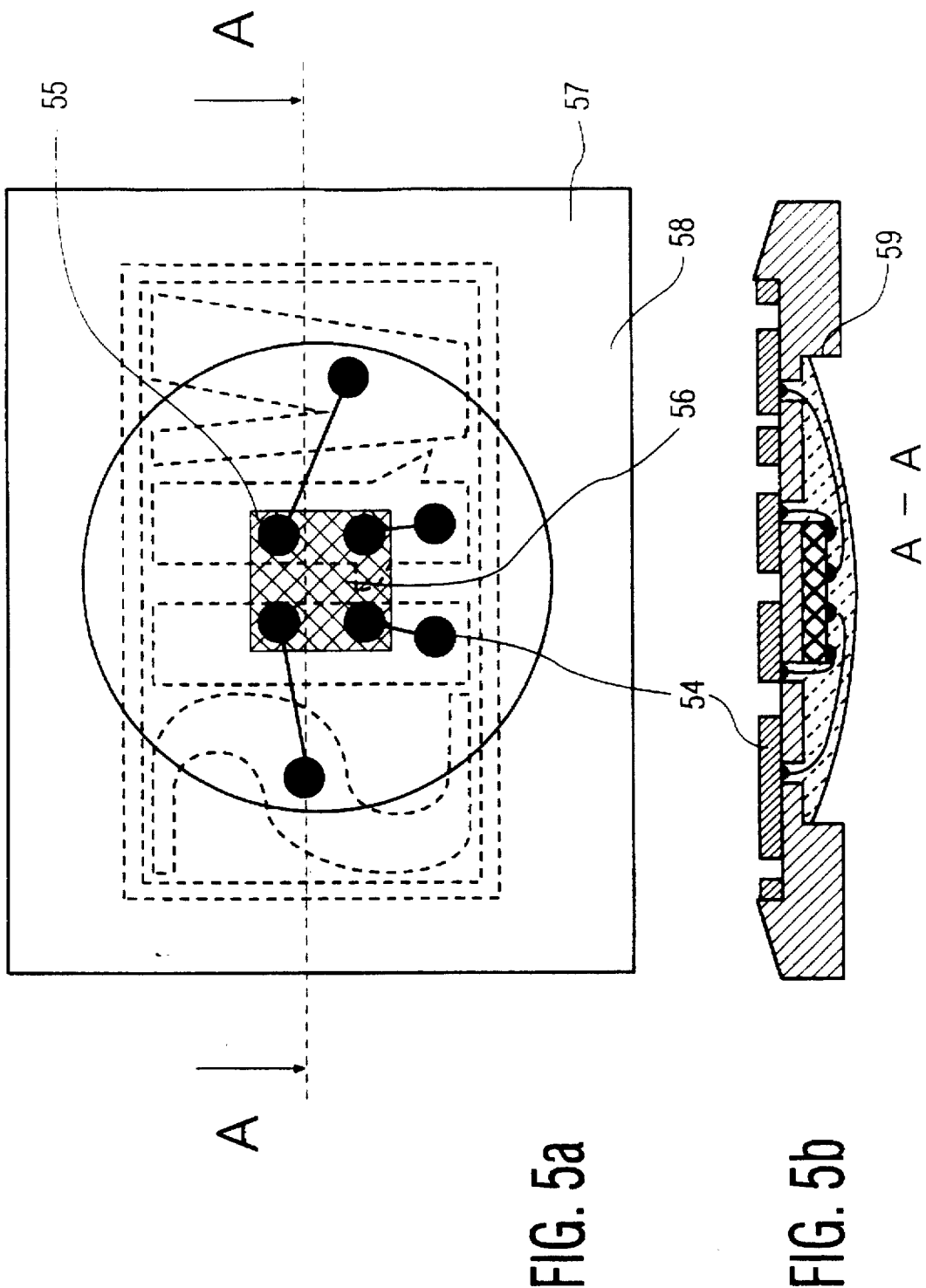
FIG. 5a shows a back view of a structural unit with a contact according to the invention and a memory connected thereto.
FIG. 5b shows a section through FIG. 5a along the line A—A.

FIG. 5a shows in a back view the connection of the contacts 54 of the contact unit 33 or 43, represented in FIGS. 3a and 4a, respectively, in the labelling field 32 or 42 with contacts 55 of a memory circuit 56. In FIG. 5b, the section in accordance with the line A—A in FIG. 5a shows that the structural unit 57 of the electrical contacts 54 together with the memory circuit 56 and a carrier 58 is preferably only approximately 0.5 mm thick overall, as shown in FIG. 3 and FIG. 4. The carrier 58 has recesses 59 for connecting the contacts 54 and 55.

The label "VHS" is shown again as a contact unit 63 in FIG. 6, the electrical contacts 64 being designed as the interspace between the representational symbols. FIG. 6 thus represents the negation of the contacts represented in FIGS. 3–5. The crosses mark the contacting section 60 of each electrical contact.

Figure 7:
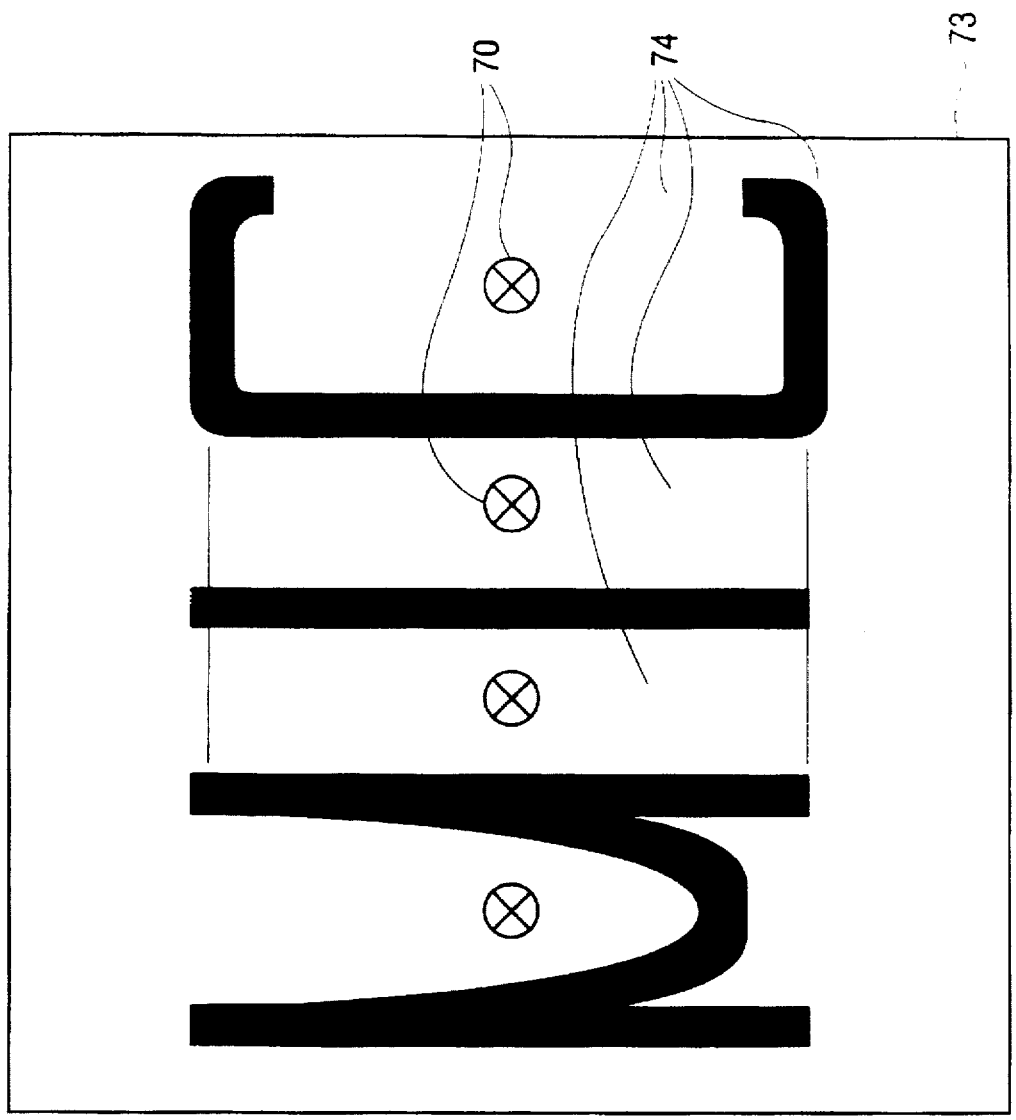
FIG. 7 shows an alternative representation of FIG. 6.

FIG. 7 is an alternative representation of FIG. 6 with the letters "MIC", which is an abbreviation for "Memory In Cassette". The electrical contacts 74 together with their respective contacting section 70 are likewise designed as the interspace between the representational symbols of the contact unit 73.

By using a video recorder (not represented) having contacting means by which an electrical contact can be produced with the electrical contacts 54, 64 and 74 shown in FIGS. 5–7, it is possible to produce a connection of the electric storage circuit 6. However, in conjunction with an evaluation unit provided in the video recorder it is already possible to determine from the presence of the electrical contacts themselves specific information on the cassette type or a recorded contribution.

A particular advantage of the invention is that labels required in any case on the video cassette form a unit with the electrical contacts, with the result that a space-saving and ergonomic design of the electrical contacts and the labelling field can be realised. If the labelling field stickers form a unit with the contacts 54, 64 and 74 and the memory connected thereto, a very simple and cost-saving assembly of the entire arrangement and of the individual components on the cassette 8 is, however, possible in a single-stage operation.

Figure 8:
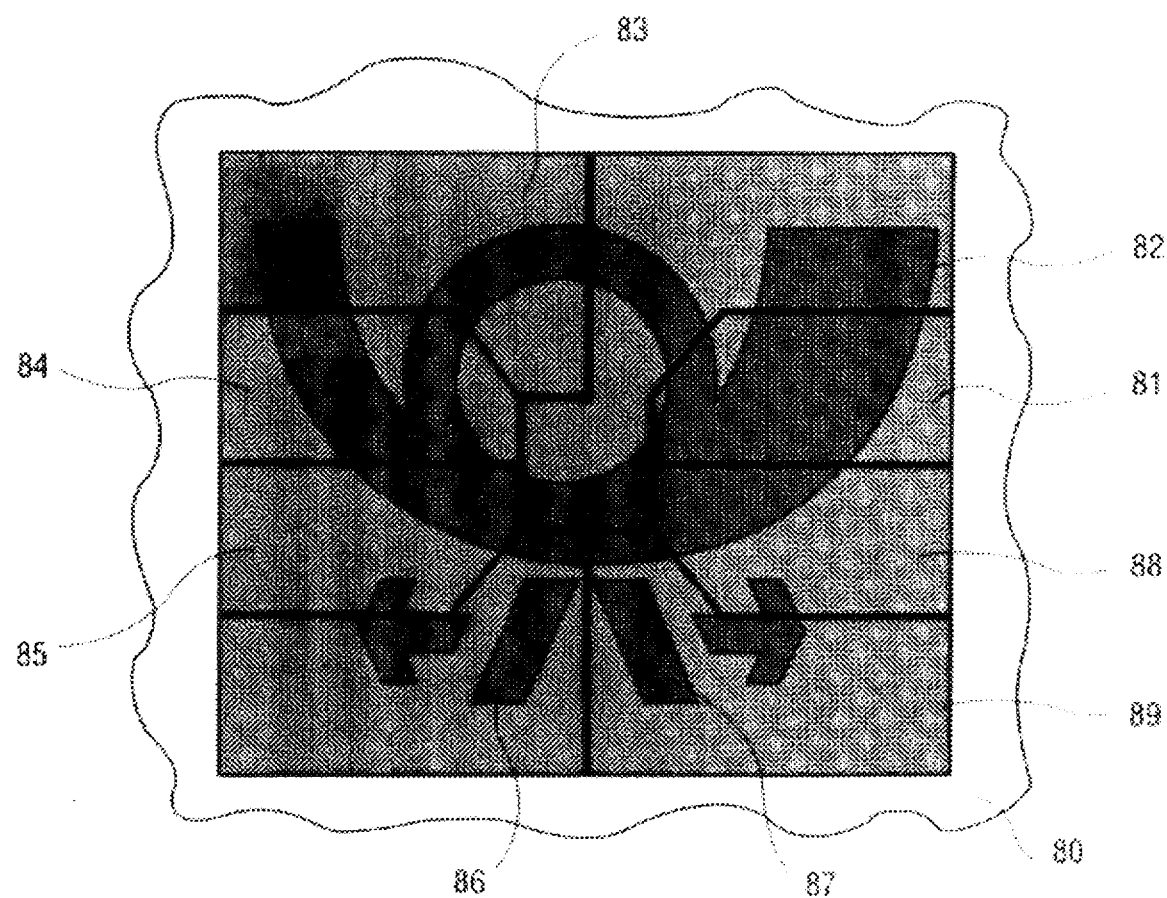
FIG. 8 shows a contact section according to the invention, arranged on a memory card.

FIG. 8 shows a contact section 89 which is arranged on a memory card 80 (represented only by a detail) and is fitted in accordance with ISO 7816 with eight contacts 81–88.

According to the invention, the contact section is additionally provided with an integrated, electrically conductive representational symbol, for example in the form of a posthorn. The electrical function of the contact section is not impaired by the introduction of this representational symbol into the contact section. Since a card forger is not immediately able to place the representational symbol in the contact section without impairing the electrical characteristics, improved security against forgery can also be achieved by the invention.

Placing the graphic character or representational symbol in the contact section can be achieved by using an appropriate mask to apply the graphic character or representational symbol to the actual contact section after the latter has been produced, it being the case that although the material has virtually the same characteristics as the contact material it differs therefrom in appearance. In the case of electrical contacts for memory cards, there is no problem in achieving this by means of different dopings or admixtures of the electrically conductive materials. For example, gold admixed with copper atoms appears darker in the case of a gold facing than does gold admixed with silver atoms.

If the contact is to serve as an electromagnetic contact, it can be used, for example, as an antenna, in particular a microstrip antenna, for a transmission interface. This has the advantage that the transmission of information can be performed in a contactless fashion. The same applies in the case of an optical contact which, for example, serves as an optical transmitter and for which information enters or exits in optical form.

Figure 9A:
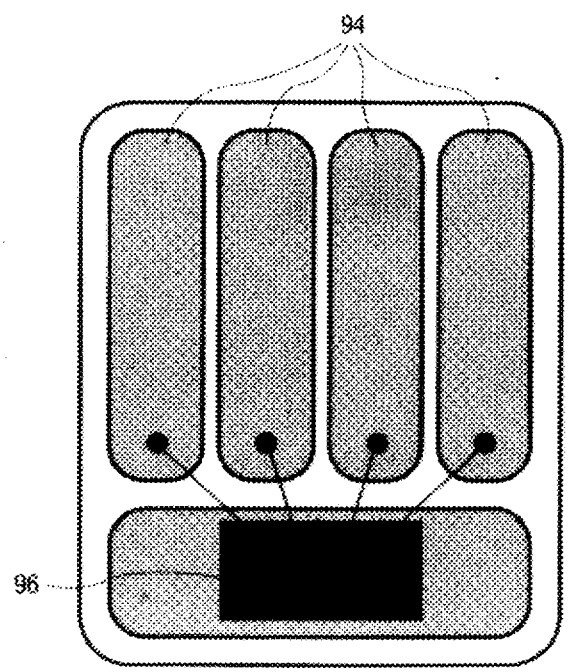
FIG. 9 shows a further contact arrangement containing a code.

FIG. 9a shows a chip 96 which is connected to four contact surfaces 94. If individual ones of these contact surfaces are additionally subdivided within the framework of the contact surfaces normally provided, a code can thereby be additionally generated such as, for example, the binary number 1010. The result of this (for a single subdivision) is $2^4=16$ code words in the case of four original contact surfaces.

As described above and represented in FIG. 10a, a chip 106 can be connected to the corresponding contact surfaces 104 and, for example, arranged on a housing of a video cassette or on a cassette or on a diskette housing. The chip can then, for example, contain in the first storage positions an item of information corresponding to that of the mechanical identifiers normally provided on cassettes or diskettes. These are, for example, tape/coating material, playing time and recording block. In this case, it is possible to dispense with the switches in the video or audio devices or diskette drives. The chip normally contains further information, for example, on stored titles and/or data packets.

In order to facilitate an identifier which is yet more favourable in price, the chip 106 can be omitted and, instead of this, appropriate information (tape/coating material, playing time and recording block) can be coded by interconnecting the contact surfaces 104. FIG. 10b shows possible combinations. The surface to which the chip is fitted can optionally be used in this case.

The position of the contact surfaces in the devices containing the corresponding scanning device can advantageously always be the same, independently of whether the cassette/diskette contains a chip. This results in identification and coding possibilities which are very versatile and extremely favourable in price.

Figure 11:
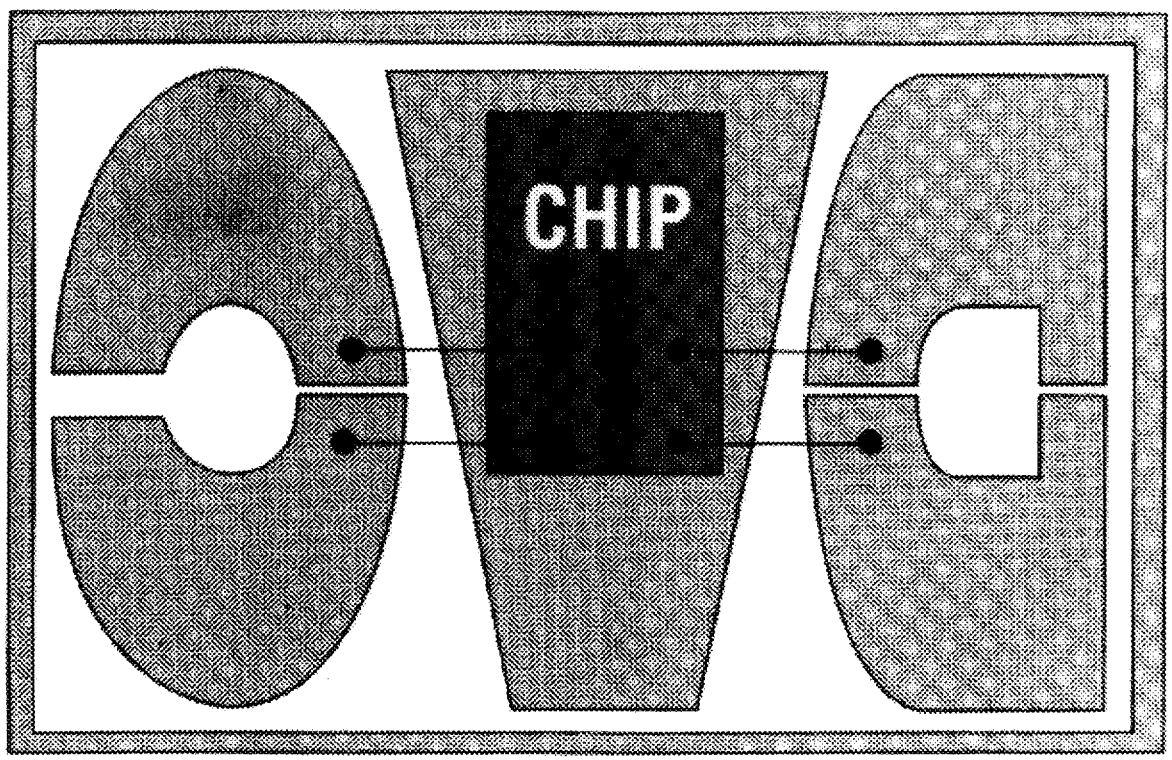
FIG. 11 shows contacting surfaces containing a code, which use letter parts as contacts.

As represented in FIG. 11, the last described arrangement can advantageously also be designed in symbolic form (DVC) with the type of contacts described further above, use being made of whole and/or partly subdivided symbols and/or letters.

Figure 9B:
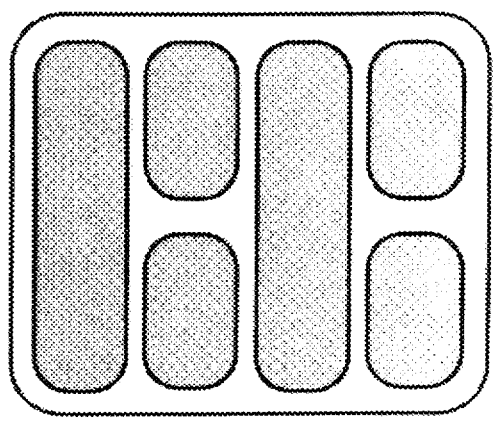

The exemplary embodiments according to FIG. 9 to FIG. 11 can also be used for corresponding optical arrangements. In this case, application of symbols can additionally be utilized, as described in FIG. 8.

The invention can be applied for products of all types in which in addition to visible labelling on the product further information is to be stored in a memory IC in a volatile fashion and/or a non-volatile fashion. Telephone cards, cheque cards, credit cards and identity cards may be named as examples.

We claim:
1. Recording cassette or diskette comprising:

means, arranged on a housing, for providing electrical contacts which include a plurality of electrically conductive contact elements which are constructed, at least partially with respect to one another, to be electrically insulated from one another, the external shape of the contact elements being designed as a pre-known graphic character(s), as parts of these graphic character(s), or as the interspaces within these graphic character(s), the contact elements either being coupled to circuit means in which information relating to the recording cassette or diskette is contained and/or can be stored, and/or some of the contact elements are coupled to other contact element(s) so that the type of these connections codes information on the recording cassette or diskette, wherein said information relating to one of the recording cassette or diskette includes information which is different from the information which is represented by said pre-known graphic characters.

2. Recording cassette or diskette according to claim 1, wherein the contact elements are arranged in a labeling field of the recording cassette or diskette.

3. Recording cassette or diskette according to claim 2, wherein the integrated circuit is an EEPROM memory.

4. Recording cassette or diskette according to claim 2, wherein the recording cassette is a video or audio cassette.

5. Recording cassette or diskette according to claim 2, wherein the external shape of the contact elements is designed as parts of a barcode unit.

6. Recording cassette or diskette according to claim 1, wherein the integrated circuit is a memory of an EEPROM.

7. Recording cassette or diskette according to claim 6, wherein the recording cassette is a video or audio cassette (8).

8. Recording cassette or diskette according to claim 6, wherein the external shape of the contact elements is designed as parts of a barcode unit.

9. Recording cassette or diskette according to claim 1, wherein the recording cassette is a video or audio cassette.

10. Recording cassette or diskette according to claim 9, wherein the external shape of the contact elements is designed as parts of a barcode unit.

11. Recording cassette or diskette according to claim 1, wherein the external shape of the contact elements is designed as parts of a barcode unit.

* * * * *